UNITED STATES PATENT OFFICE.

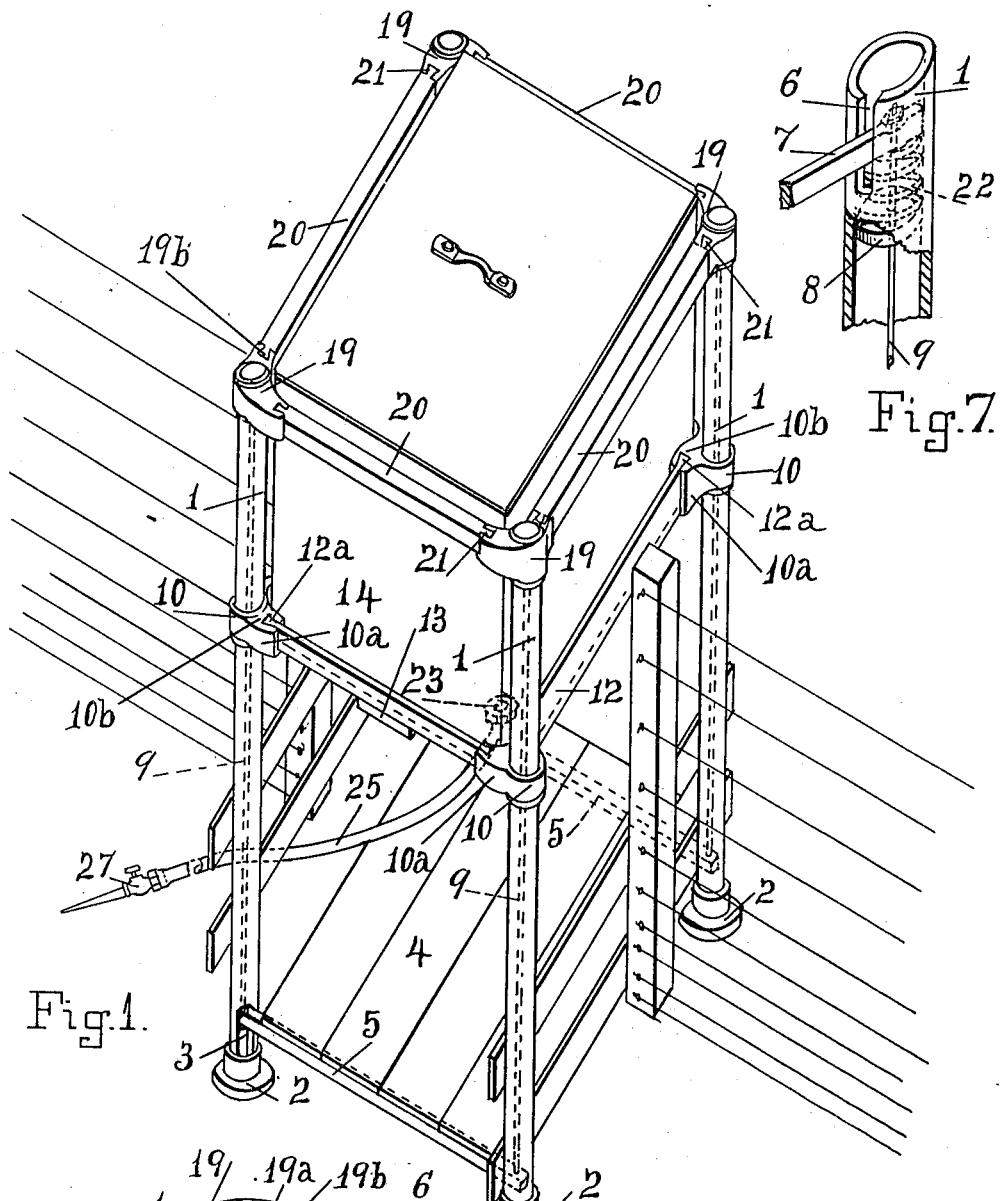

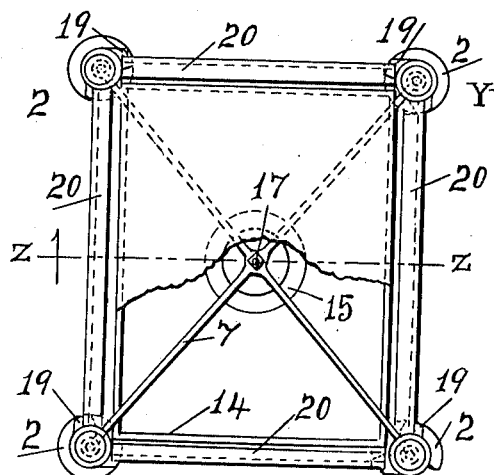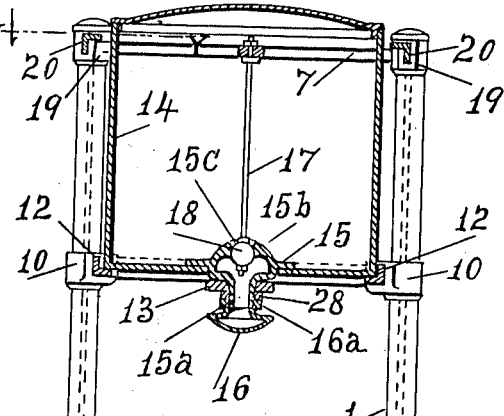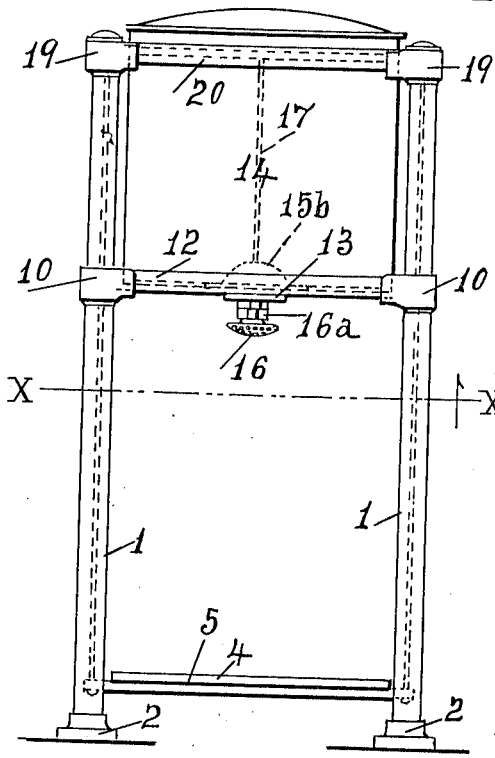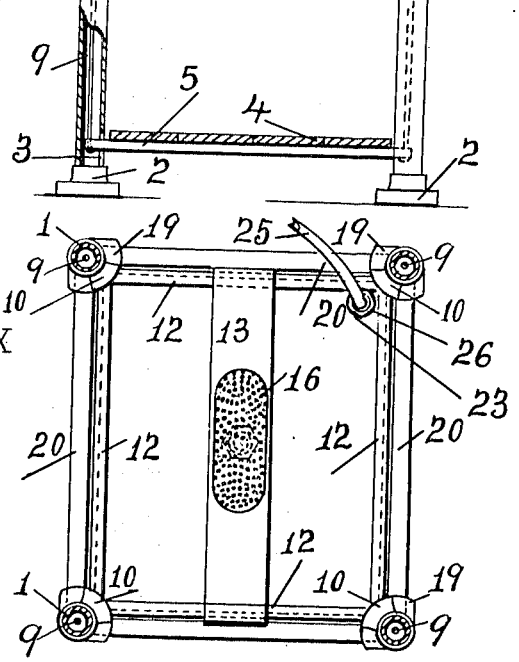

DANIEL W. NOLAN, OF SPRINGFIELD, ILLINOIS, ASSIGNOR TO MARY J. NOLAN, OF SPRINGFIELD, ILLINOIS.

AUTOMATIC STOCK-SPRAYER.

1,055,288.  Specification of Letters Patent.  Patented Mar. 4, 1913.

Application filed February 15, 1912. Serial No. 677,702.

*To all whom it may concern:*

Be it known that I, DANIEL W. NOLAN, a citizen of the United States, residing at Springfield, in the county of Sangamon and State of Illinois, have invented a new and useful Automatic Stock-Sprayer, of which the following is a specification.

This invention relates to means for applying insecticides, or antiseptic, or medicinal liquids, or compounds to animals.

The purpose of the invention is to provide an apparatus of simple construction, reasonable cost, easily operated and effective for the purpose stated.

The invention in its preferable form is embodied in the apparatus shown in the annexed drawing and is hereinafter particularly described and finally recited in the claim.

Figure 1 is an isometric view of the apparatus. Figs. 2 and 3 are a front elevation, and a top plan, respectively. Fig. 4 is a horizontal section on the line X. X. of Fig. 2, looking upward. Fig. 5 is an enlarged partial horizontal section on the line Y. Y. of Fig. 6. Fig. 6 is a vertical section on the line Z. Z. of Fig. 3 and Fig. 7 is an enlarged detail of one of the supporting springs and connections.

Similar reference numerals designate like parts in the different views.

The invention contemplates the use of a suitable vessel containing a supply of the desired liquid, a valve controlling the discharge of the liquid from the vessel, a platform positioned so that the animal to be treated will pass onto the platform, and means connecting the platform with the valve so that the depressing of the platform by the weight of the animal will cause the valve to open and cause the liquid to be sprayed upon the animal, and when the animal goes off the platform the valve will automatically close and the flow of the liquid will be stopped.

The apparatus is particularly designed for the treatment of hogs, sheep, and other live stock.

The main frame comprises four vertical corner posts 1 preferably of gas pipe provided with base plates 2 which may be secured in place on the ground or on any suitable support. Near the lower end of each post is a longitudinal slot 3. The platform 4 has on its underside transverse bars 5 adapted for free vertical movement in the slots 3. Near the upper end of each corner post is a longitudinal slot 6 (Figs. 5 and 6) adapted to accommodate vertically movable diagonal bars 7 which are connected with each other. Within each corner post and below and adjacent to the slot 6 is a stationary ring 8. Vertical rods 9 within the posts 1, have their lower ends connected with the cross bars 5 and their upper ends connected with the diagonal bars 7 so that the cross bars and diagonal bars will move vertically in unison. Blocks 10 of approximately cylindrical form are secured on the posts 1 respectively and have members $10^a$ provided with dove-tail mortises $10^b$ adapted to receive dove-tail tenons on the rails which support the tank. Angle-bar rails 12 have dove-tail tenons $12^a$ fitting in the mortises $10^b$ in the blocks 10. A transverse plate 13 serves to strengthen the frame.

The tank 14 is preferably of sheet metal and is supported on the inwardly extending flanged members of the rails 12.

Centrally located on the bottom of the tank 14 is a valve body 15 provided with a downwardly extending pipe $15^a$ screw-threaded at its lower end. The top $15^b$ of the valve body has a circular hole $15^c$ through which liquid from the tank flows into the valve body. An elongated perforated sprayer head 16 has an integral screw-threaded nut $16^a$ screwing onto the pipe $15^a$ to connect the sprayer head with the valve body. The sprayer head may be removed from the valve body by unscrewing the nut $16^a$. The under surface of the top of the valve body is beveled to form a valve seat. A ball 18 within the valve body is adapted to close the opening through the top of the valve. A rod 17 is connected with the diagonal bars 7 and with the ball 18 and when the rod is depressed, the valve will be opened and when the rod is raised, the valve will be closed. When the sprayer head is detached, the nut 28 connecting the valve body with the plate 13 may be unscrewed and the valve body may be lifted upward through the tank. The liquid from the tank flows through the valve and through the sprayer head and is sprayed onto the animal occupying the platform.

Fixed tubular blocks 19 surround the upper ends of the posts 1 respectively and have slots 19ᶜ registering with the slots 6 in the posts. The diagonal bars 7 extend through the slots 19ᶜ and 6 and are connected with the vertical rods 9 respectively. The blocks 19 have members 19ᵃ provided with dove-tail mortises 19ᵇ. The top rails 20 have dove-tail tenons 21 fitting in the mortises 19ᵇ respectively to detachably connect the top rails with the blocks 19.

Springs 22 interposed between the diagonal bars 7 and the stationary rings 8 serve to normally support the platform 4 and the diagonal bars 7 in their raised position to normally keep the valve closed. When weight is applied on the platform 4 the weight will cause compression of the springs 22 and the descending diagonal bars will push the rod 17 downward to open the valve. When the weight is removed the springs will act to raise the platform and the diagonal bars to their initial positions and close the valve.

A nipple 23 is connected on the tank 14, and a hose 25 is connected with the nipple 23 by a nut 26. A nozzle 27 of usual construction, is suitably connected with the hose 25. The hose and nozzle are for occasional use in spraying animals or things within the scope of the hose.

For ordinary use medicated liquid will be supplied in the tank, but if desired, the tank may be supplied with water and the water may be applied through the hose or through the sprayer head as desired.

In practice, the apparatus will preferably be placed in the opening between the two inclosures as shown in Fig. 1, so that the animal going from one inclosure to the other must traverse the platform and the weight of the animal on the platform will cause the opening of the valve and the spraying of the animal. It is obvious, however, that the apparatus may be used in any situation in which the animal will travel on the platform and that the hose may be used to spray animals or things located at a considerable distance from the apparatus.

Having fully described my invention what I claim as new and desire to secure by Letters Patent is—

The combination of tubular corner posts, each having an upper slot and a lower slot; blocks stationary on said corner posts; rails detachably mounted on said blocks; a tank supported on said rails and located in the space bounded by said tubular corner posts; a downwardly-opening valve centrally located on the bottom of the tank; a downwardly-extending pipe communicating with said valve; a sprayer connected with said pipe; platform bars having terminals movable vertically in the lower slots of said tubular corner posts; a platform on said platform bars and adapted to accommodate the animal being treated; diagonal bars having terminals movable vertically in the upper slots of said tubular corner posts; a connecting device connecting said diagonal bars with said valve to open the valve when the diagonal bars are depressed; spring-supports within the tubular corner posts; springs supported on said spring-supports respectively and supporting the terminals of the diagonal bars and effective to support the platform and likewise effective to raise the diagonal bars to keep the valve closed; screw-threaded rods within said tubular corner posts respectively, and connecting the terminals of the diagonal bars with the terminals of the platform bars respectively; and nuts on said screw-threaded rods adapted to adjust the tension of said springs to effect accurate closing of the valve.

In witness whereof, I have hereunto signed my name at Springfield, Illinois, this third day of February, 1912.

DANIEL W. NOLAN.

Witnesses:
PEARL THAIN,
W. S. TROXELL.